United States Patent
Siaud et al.

(10) Patent No.: US 9,176,222 B2
(45) Date of Patent: Nov. 3, 2015

(54) METHOD AND A DEVICE FOR LOCATING AT LEAST ONE OBSTACLE IN A COMMUNICATIONS NETWORK, A CORRESPONDING COMPUTER PROGRAM

(75) Inventors: Isabelle Siaud, Rennes (FR); Anne-Marie Ulmer-Moll, Rennes (FR)

(73) Assignee: FRANCE TELECOM, Paris (FR)

( * ) Notice: Subject to any disclaimer, the term of this patent is extended or adjusted under 35 U.S.C. 154(b) by 247 days.

(21) Appl. No.: 13/820,077

(22) PCT Filed: Aug. 31, 2011

(86) PCT No.: PCT/FR2011/051999
§ 371 (c)(1),
(2), (4) Date: Feb. 28, 2013

(87) PCT Pub. No.: WO2012/089942
PCT Pub. Date: Jul. 5, 2012

(65) Prior Publication Data
US 2013/0154872 A1    Jun. 20, 2013

(30) Foreign Application Priority Data
Sep. 1, 2010   (FR) ..................................... 10 56931

(51) Int. Cl.
*G01S 13/06* (2006.01)
*G01S 13/08* (2006.01)
(Continued)

(52) U.S. Cl.
CPC ................ *G01S 13/003* (2013.01); *G01S 13/08* (2013.01); *G01S 13/10* (2013.01); *G01S 13/103* (2013.01)

(58) Field of Classification Search
CPC ....... G01S 13/003; G01S 13/02; G01S 13/04; G01S 13/06; G01S 13/08; G01S 13/10; G01S 13/103

USPC ........... 342/21, 22, 27, 28, 29–32, 52, 59, 73, 342/82–84, 89, 91, 92, 104–115, 118, 125, 342/126, 134–147, 175, 195; 367/87, 99, 367/107, 113, 117
See application file for complete search history.

(56) References Cited

U.S. PATENT DOCUMENTS 2,515,332 A * 7/1950 Budenbom .................... 342/126
2,569,758 A * 10/1951 Gutton et al. .................. 342/139
(Continued)

OTHER PUBLICATIONS

International Search Report and Written Opinion dated Nov. 23, 2011 for corresponding International Application No. PCT/FR2011/051999, filed Aug. 31, 2011.
(Continued)

*Primary Examiner* — Bernarr Gregory
(74) *Attorney, Agent, or Firm* — David D. Brush; Westerman, Champlin & Koehler, P.A.

(57) ABSTRACT

A method and apparatus are provided for locating an obstacle between a transmitter and a receiver. The method includes: determining at least one elliptical ring in which the obstacle is situated, the elliptical ring being defined by two confocal ellipses, having their focuses corresponding to the transmitter and to the receiver, each elliptical ring being associated with a physical echo generated by an obstacle; estimating a distance between the obstacle and a focus as a function of the separation between the confocal ellipses at the obstacle in a plane normal to the axis defined by the focuses so as to obtain a set of potential location zones for the obstacle in the elliptical ring; and lifting the ambiguity between the various potential location zones of the obstacle so as to deliver a location zone of the obstacle.

12 Claims, 6 Drawing Sheets

(51) Int. Cl.
*G01S 13/00* (2006.01)
*G01S 13/10* (2006.01)

(56) References Cited

U.S. PATENT DOCUMENTS

| | | | | | |
|---|---|---|---|---|---|
| 2,763,857 | A | * | 9/1956 | Valley, Jr. | 342/125 |
| 2,986,729 | A | * | 5/1961 | Walker | 342/92 |
| 3,112,484 | A | * | 11/1963 | McKeown | 342/52 |
| 3,160,846 | A | * | 12/1964 | Rounding, Jr. et al. | 342/52 |
| 3,227,994 | A | * | 1/1966 | McKeown | 367/113 |
| 3,541,551 | A | * | 11/1970 | Bystrom, Jr. et al. | 342/27 |
| 3,795,911 | A | * | 3/1974 | Hammack | 342/106 |
| 3,996,590 | A | * | 12/1976 | Hammack | 342/126 |
| 4,027,307 | A | * | 5/1977 | Litchford | 342/32 |
| 4,051,472 | A | * | 9/1977 | Albanese et al. | 342/28 |
| 4,642,648 | A | * | 2/1987 | Hulland et al. | 342/32 |
| 7,515,092 | B2 | * | 4/2009 | Zumsteg | 342/59 |
| 8,379,782 | B2 | * | 2/2013 | Dent et al. | 342/84 |
| 8,502,729 | B2 | * | 8/2013 | Leach et al. | 342/28 |

OTHER PUBLICATIONS

Nicholas J. Willis Ed—Nicolas J. Willis: "Bistatic Radar, Passages", Internet Citation, 2005, pp. 2, 6-7, 59 XP002632877. Url: http://proxy.bookfi.org/genesis1/165000/ad9e601e1a929e15be813-b085c801ced/_as/%5BNicholas%20J.%20Willis%5D_Bistatic%20radar(BookFi.org).pdf.

Martin Tobias et al., "Multitarget Tracking Using Multiple Bistatic Range Measurements with Probability Hypothesis Densities", Proceedings of the SPIE, SPIE, Bellingham, VA, US, vol. 5429, Apr. 12, 2004, pp. 1-10, XP002632878.

French Search Report and Written Opinion dated Apr. 14, 2011 for corresponding French Application No. 1056931, filed Sep. 1, 2010.

International Preliminary Report on Patentability and English translation of Written Opinion dated Mar. 5, 2013 for corresponding International Application No. PCT/FR2011/051999, filed Aug. 31, 2011.

N. Delligiannis, S. Louvros, S. Kotsopoulos, "Optimizing location positioning using hybrid ToA-AoA techniques in mobile cellular networks", Mobimedia'07 Conference, May 2007.

N. Delligiannis, S. Louvros, "Hybrid TOA AOA location positioning techniques in GSM networks", Wireless Personal Communication, May 2009, Springer.

B.T. Fang, "Simple solutions for hyperbolic and related position fixes", IEEE Transactions on Aerospace and Electronic Systems, 26(5), pp. 748 753, 1990.

G. Turin, W. Jewell, T. Johnston, "Simulation of urban vehicle-monitoring systems", IEEE Trans. Vehic. Tech., vol. VT 21, Feb. 1972, pp. 9 16).

3GPP TS 25.305. (Mar. 2002). "Stage 2 functional specification of UE positioning in UTRAN".

* cited by examiner

1: d=5 m, 1781 MHz   2: d=5 m, 528 MHz   3: d=10m,1781 MHz
4: d=10m,528 MHz     5: d=20 m, 1781 MHz  6: d=20 m, 528 MHz

Figure 9a  1: echo $\tau_0$   2: echo $\tau_1$   3: echo $\tau_2$

METHOD AND A DEVICE FOR LOCATING AT LEAST ONE OBSTACLE IN A COMMUNICATIONS NETWORK, A CORRESPONDING COMPUTER PROGRAM

CROSS-REFERENCE TO RELATED APPLICATIONS

This Application is a Section 371 National Stage Application of International Application No. PCT/FR2011/051999, filed Aug. 31, 2011, which is incorporated by reference in its entirety and published as WO 2012/089942 on Jul. 5, 2012, not in English.

STATEMENT REGARDING FEDERALLY SPONSORED RESEARCH OR DEVELOPMENT

None.

THE NAMES OF PARTIES TO A JOINT RESEARCH AGREEMENT

None.

FIELD OF THE DISCLOSURE

The field of the disclosure is that of locating terminals in a communications network, and more particularly terminals seeking to communicate with one another.

More precisely, the disclosure relates to such a locating technique, in particular in the field of cognitive radio or spectrum management techniques, or in the field of so-called "green radio" techniques, i.e. techniques making provision for adapting the beam of radiation between two terminals so as to reduce transmission power.

BACKGROUND OF THE DISCLOSURE

Locating techniques are known that are based on three different classes of techniques:
  so-called time of arrival (ToA) or differential time of arrival (DToA) techniques. DToA techniques make use of a measurement of propagation times $\delta\tau i$ between a reference terminal and the terminal that is to be located, also referred to as the obstacle terminal, and a corresponding distance $c\delta\tau i$ where c is the propagation speed of the wave. These techniques require a plurality of mutually synchronized reference terminals in order to locate the obstacle terminal. DToA techniques measure relative time differences between the terminals compared with a reference terminal common to the other reference terminals. It is necessary for the time reference to be common. Thus, the relative position of obstacles is determined by estimating the relative propagation times of waves from the obstacle terminal to the reference terminals and this requires at least three different reference terminals that are mutually synchronized in order to find a two-dimensional position corresponding to the point of intersection of the locuses of the points associated with each propagation time;
  other techniques that are much less accurate rely on the network identification of the cell in which the obstacle terminal is to be found and the identification of the obstacle terminal in that cell, known as its cell identification (CID), in order to locate the terminal. Locating the terminal within the cell makes use of a so-called timing advance (TA) parameter and constitutes a very approximate estimate of position, associated with the size of the cell. One such technique is described for example in the document: 3GPP TS 25.305. (March 2002). "Stage 2 functional specification of UE positioning in UTRAN"; and
  still other techniques, known as angle of arrival (AoA) techniques, take account of estimated angles for waves being received at each reference terminal, whenever the obstacle terminal transmits a signal. Thus, the relative positions of the obstacles are determined by the point of intersection between the locuses of points described by the arrival directions of the waves at the obstacle terminal, as proposed in the document by N. Delligiannis, S. Louvros, S. Kotsopoulos, "Optimizing location positioning using hybrid ToA-AoA techniques in mobile cellular networks", Mobimedia '07 Conference, May 2007. These techniques require an intelligent antenna at each reference terminal. Nevertheless, they present position inaccuracy that results from the multi-path nature of the propagating waves, giving rise to distinct arrival directions associated with various obstacles (diffusers) that affect the signal being received. A cost function is proposed in order to improve the estimate, taking account of the power received at each reference terminal and the angular dispersion.

There also exist techniques that hybridize the AoA and ToA techniques in order to improve the locating of terminals, as proposed in the document by N. Delligiannis, S. Louvros, "Hybrid TOA-AOA location positioning techniques in GSM networks", Wireless Personal Communication, May 2009, Springer. Under all circumstances, those techniques require fine synchronization between a plurality of reference terminals (ToA technique) or indeed an intelligent antenna (AoA technique).

Figure 1A:
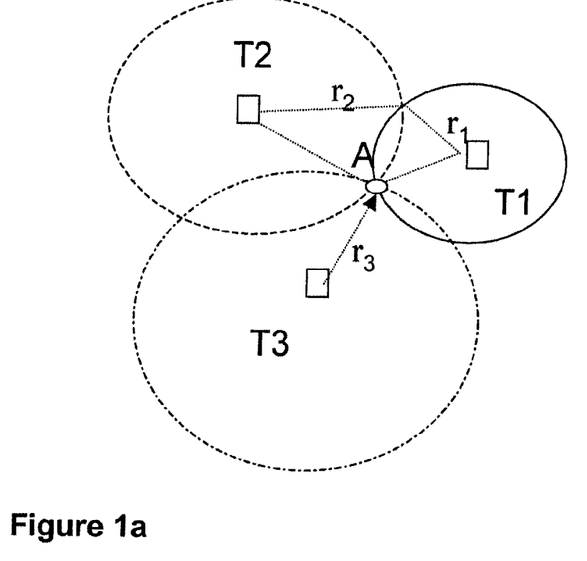
FIGS. 1a and 1b, described above with reference to the prior art, present examples of the ToA techniques for locating an obstacle terminal A.

The principle of two-dimensional ToA and DToA techniques consists in measuring the time interval $\delta\tau i$ between the signal transmitted by the obstacle terminal and the signal received by the reference terminals. This measurement makes it possible to calculate the relative distances between the terminals using a differential technique. Each interval $\delta\tau i$ that corresponds to the propagation delay of the signal between a reference terminal Ti and the obstacle terminal A, is associated with a radius $ri=c\delta\tau i$ of a circle Ci of center Ti, where Ti is the position of the reference terminal. Using a simple approach in a two-dimensional plane, the obstacle terminal A is located by considering the point of intersection of three circles of radius $ri=c\delta\tau i$, as shown in FIG. 1a, where c is the propagation speed of the wave in air. The exact position of the obstacle terminal, considering the point of intersection of the three circles, is valid only if the third circle coincides exactly with one of the points of intersection of the other two circles.

Figure 1B:
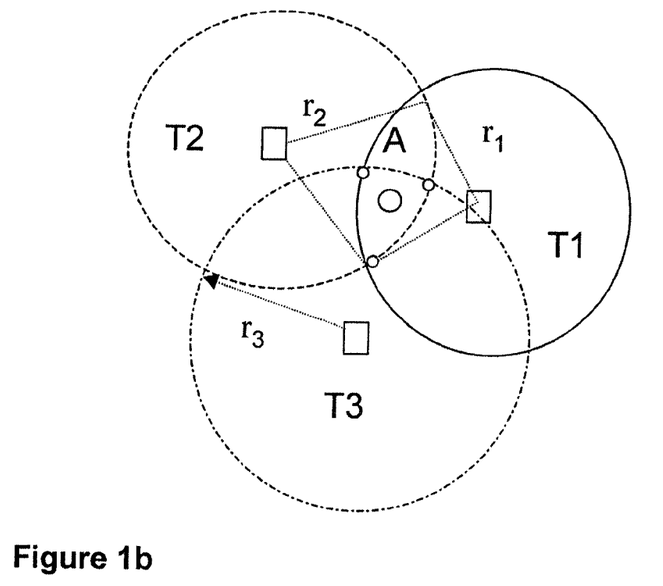

More generally, and as shown in FIG. 1b, when a connection might be obstructed, the point of intersection of the three circles leads to an overlap zone and not to a point. This zone is defined by three points corresponding to the point of intersection of the circles taken in pairs and situated inside the third circle. The barycenter (or center of gravity) of the three points of intersection gives an approximation to the position of the terminal, as described in the document by N. Delligiannis, S. Louvros, S. Kotsopoulos, "Optimizing location positioning using hybrid ToA-AoA techniques in mobile cellular networks", Mobimedia '07 Conference, May 2007.

Using a more complete approach that results from processing the problem in three dimensions and making use of a DToA technique that takes account of the relative positions of the reference terminals (Ti) compared to one of the reference terminals (T1) taken as a reference, it is shown that the position of the obstacle terminal A then results from the point of intersection of three hyperbolas or three ellipses, thereby requiring four synchronized signals to be received at four reference terminals Ti. By way of example, that is demonstrated for locating boats by using beacons in the article by B. T. Fang, "Simple solutions for hyperbolic and related position fixes", IEEE Transactions on Aerospace and Electronic Systems, 26(5), pp. 748-753, 1990.

A drawback of those ToA and DToA techniques of the prior art lies in the need to use at least three reference terminals that are mutually synchronized in accurate manner. Furthermore, those techniques present an error associated with the synchronization between the reference terminals and with the quality of the point-to-point connection (visibility or obstructed link giving rise to an indirect path between the obstacle terminal and the reference terminal). The obstructed nature of the link increases the propagation time without changing the distance between the two terminals. This modification to the propagation time takes account of the indirect path of the wave between the two terminals. This leads to an error on the estimated distance between the two terminals. Proposals have been made for enhanced ToA (E-ToA) techniques that make use of cost functions. Those techniques consist in weighting the error introduced for each point-to-point link (the technique described in particular in the document by G. Turin, W. Jewell, T. Johnston, "Simulation of urban vehicle-monitoring systems", IEEE Trans. Vehic. Tech., Vol. VT-21, February 1972, pp. 9-16) and in estimating position by a least squares method. An improvement consisting in refining position in an iterative method is also proposed in the document by N. Delligiannis, S. Louvros, S. Kotsopoulos, "Optimizing location positioning using hybrid ToA-AoA techniques in mobile cellular networks", Mobimedia '07 Conference, May 2007. In contrast, those E-ToA techniques continue to require synchronization between a plurality of reference terminals.

There therefore exists a need for a novel technique of locating terminals that does not require a plurality of reference terminals (at least three) to be synchronized, while nevertheless giving a location that is reliable and accurate, with implementation complexity that is small.

SUMMARY

An exemplary embodiment of the present disclosure relates to a method of locating at least one obstacle between a transmitter and a receiver, by performing the following steps:
  determining at least one elliptical ring in which said obstacle is situated, said elliptical ring being defined by two confocal ellipses, having their focuses corresponding to said transmitter and to said receiver, each elliptical ring being associated with a physical echo generated by an obstacle
  estimating a distance between said obstacle and said focuses as a function of determining the separation between said confocal ellipses at said obstacle in a plane normal to the axis defined by said focuses so as to obtain a set of potential location zones for said obstacle in said elliptical ring; and
  lifting the ambiguity between the various potential location zones of said obstacle as a function of said distance so as to deliver a location zone of said obstacle.

Thus, in an embodiment of the invention, an obstacle is identified in three stages, on the basis in particular of analyzing the ellipse, or more exactly the elliptical ring, to which it belongs.

In at least one particular implementation, the method comprises a prior step of estimating the impulse response of the transmission channel between said transmitter and said receiver. Thus, said step of determining an elliptical ring and/or said step of estimating a distance makes use of an analysis of at least one meaningful peak of said impulse response in order to determine information representative of the position of the obstacle.

By way of example, said estimate of the impulse response may be obtained by analyzing a signal received by said receiver and corresponding to a test signal transmitted by said transmitter.

In particular, said step of determining an elliptical ring may take account of at least three propagation delays corresponding to at least two meaningful peaks of said impulse response:
  a delay $\tau 0$ corresponding to the main peak of said impulse response and representative of the direct path between said transmitter and said receiver; and
  two delays ($\tau 1, \tau 2$) corresponding to a secondary peak due to at least two paths reflected by said obstacle.

This step of determining an elliptical ring may thus comprise the substeps of:
  obtaining a distance d between said transmitter and said receiver such that $d=c\tau_0$, where c is the speed of light; and
  estimating a distance $d_1$ between said obstacle and one of said focuses as projected onto the major axis of said ellipses defined by said focuses, as a function of a reference chart and of said separation.

Furthermore, said step of estimating a distance between said obstacle and one of said focuses may take account of the width of at least one meaningful peak associated with said obstacle. Said width may for example be measured at −3 decibels (dB) on said meaningful peak.

In at least one particular implementation, said step of lifting ambiguity takes account of an estimate of a Doppler delay function for the delays associated with the main peak and the secondary peak of the impulse response, the secondary peak being associated with said obstacle.

This estimate of the Doppler delay may thus provide an estimate of the arrival angle $\theta v$ of a test signal at said receiver for said delay. Under such circumstances, said step of lifting the ambiguity may comprise a step of comparing the value of said arrival angle $\theta v$ with at least one predetermined angle value for said potential location zones.

In a particular application of an embodiment of the invention, the method further comprises a step of managing resource allocation in a communications network to which said transmitter and said receiver belong, as a function of said location zone.

This resource allocation is thus optimized by taking account of the obstacles that have been detected. In particular, knowledge of the position of a terminal that is seen by the transmitter and the receiver as an obstacle can enable a base station that is acting as a transmitter or as a receiver and that is implementing the method to select the same radio channel if the communications beams used respectively by the terminal and the transmitter or the receiver are separate in three-dimensional space.

In another particular application, in particular when said at least one obstacle $P_i$ corresponds to at least one interfering element, the method also includes a step of adjusting the radiation patterns of the antennas of said communications network to obtain radiation patterns that are adjusted so that said at least one interfering element does not lie in a direction of transmission from said antennas.

This makes it possible to optimize the efficiency of transmission, and where appropriate the power needed for transmission.

An embodiment of the invention also provides devices for locating at least one obstacle between a transmitter and a receiver (which devices may be incorporated in the transmitter and/or the receiver), by implementing a method as described above.

In particular, such a device comprises:
means for determining at least one elliptical ring in which said obstacle is situated, said elliptical ring being defined by two confocal ellipses having focuses that correspond to said transmitter and to said receiver, each elliptical ring being associated with a physical echo generated by an obstacle;
means for estimating a distance between said obstacle and one of said focuses as a function of determining the separation between said confocal ellipses at said obstacle in a plane normal to the axis defined by said focuses, so as to obtain a set of potential location zones for said obstacle in said ring; and
means for lifting the ambiguity between the various potential location zones for said obstacle as a function of said distance so as to deliver a location zone for said obstacle.

An embodiment of the invention also provides computer program products downloadable from a communications network and/or recorded on a computer-readable medium and/or executable by a processor, comprising program code instructions for executing steps of the locating method as described above, when such a program is executed on a computer.

BRIEF DESCRIPTION OF THE DRAWINGS

Other characteristics and advantages appear more clearly on reading the following description of a particular implementation given merely by way of illustrative and non-limiting example, and with reference to the accompanying drawings, in which.

DETAILED DESCRIPTION OF ILLUSTRATIVE EMBODIMENTS

1. General Principle
1.1 Identifying an Obstacle

An embodiment of the invention thus proposes a novel approach for locating one or more obstacles situated between a transmitter and a receiver. The term "obstacle" is used herein to designate both an interfering element (e.g. a building) and also a radiocommunications terminal other than the transmitter and the receiver. The transmitter and the receiver may naturally be transmitter and receiver terminals.

Figure 2:
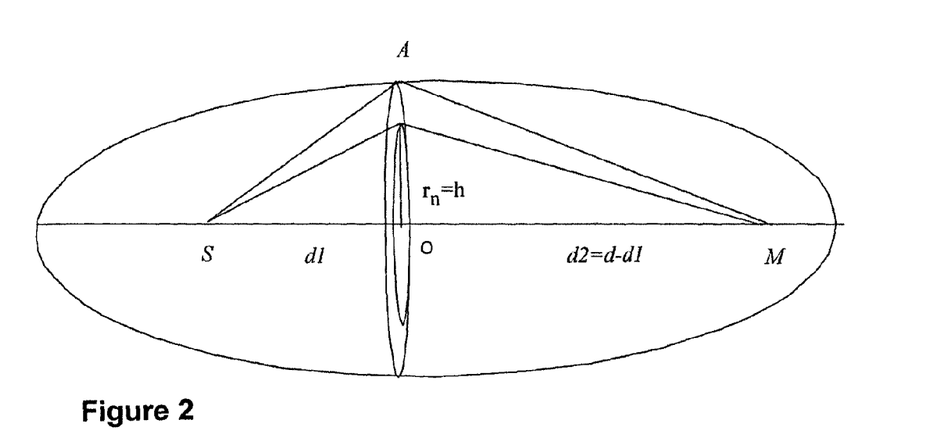
FIG. 2 shows the principle for determining Fresnel zones.

The approach of an embodiment of the invention relies on estimating location on the basis of Fresnel zones, with the principle of Fresnel zones being summarized in Appendix A and shown in FIG. 2. On the basis of this principle, three steps are performed for a given obstacle:
determining an elliptical ring in which the obstacle is present;
estimating the distance between the transmitter or the receiver and the obstacle, thereby making it possible to define several potential locations (generally four as a result of symmetries, when considering an ellipse in a plane); and
searching for the real location, or lifting the ambiguity.

The elliptical ring is defined by two locating ellipses, i.e. two confocal ellipses having as their focuses the transmitter and the receiver. This ring is of thickness that varies as a function of the position of the obstacle (greater thickness at equal distances from the transmitter and the receiver, smaller thickness close to the transmitter or to the receiver). By determining this thickness, it is thus possible to deduce information about the distance between one of the focuses and the obstacle. The obstacle is thus characterized by the elliptical ring to which it belongs and by said distance.

Several zones potentially correspond to those characteristics, and ambiguity is subsequently lifted, e.g. by analyzing the Doppler delay function of meaningful peaks associated with the obstacle.

1.2 Obtaining Position-Identification Information

These characteristics may be obtained in particular by analyzing the impulse response of the propagation channel between the transmitter and the receiver, e.g. obtained on the basis of a test signal or a reference signal that is transmitted by the transmitter and received by the receiver. Thereafter it is possible to use the power profile of the impulse response.

It is found that analyzing meaningful peaks makes it possible to define the characteristics that are needed for locating the position:
the first peak, or "main" peak is representative of the direct path between the transmitter and the receiver, and thus of the distance between the two focuses;
the secondary meaningful peaks correspond to paths that have been reflected on obstacles, and thus correspond to echoes. Analyzing a secondary peak makes it possible to determine:
the durations of the reflected paths, and as a function of the direct path, the locating ellipses, or more exactly an elliptical ring, to which the obstacle belongs; and
the distance between the obstacle and one of the focuses in a plane normal to the axis defined by said focuses, by determining the thickness of the elliptical ring at the obstacle, on the basis of the width of the peak under consideration (e.g. −3 dB).

When a plurality of obstacles are present, the same approach is applied to each corresponding secondary peak.
1.3 An example of Determining a Location There follows a more theoretical interpretation of an exemplary implementation of the invention.

The approach of an embodiment of the invention thus proposes locating an obstacle on the basis of defining a path variation $\Delta d$ between two echoes belonging to a given physical echo in the power profile of the propagation channel under consideration, and corresponding to spatial positioning uncertainty $\Delta r$ concerning the obstacle in the plane normal to the transmitter-receiver axis containing the obstacle.

The transmission of a test signal between the transmitter and the receiver typically makes it possible to obtain the power profile of the propagation channel. Each value of the profile associated with a delay $\tau i$ is said to be an echo or an echo $\tau i$.

Each echo $\tau i$ of the impulse response of the propagation channel corresponds to the direct path between the transmitter and the receiver or else to an indirect path generated by an obstacle on which the wave transmitted from the transmitter is reflected before being received by the receiver. All potential positions of the obstacle in a plane correspond to the locuses of points of an ellipse having the transmitter and the receiver as its focuses and having a major axis of length equal to the distance traveled by the wave transmitted from the transmitter and received by the receiver after reflection on the obstacle.

At a delay $\tau 0$, this power profile presents a maximum, which is the main peak, and at delays $\tau i$ (greater than $\tau 0$) it presents local maximums (secondary peaks). The main peak corresponds to the direct path. The local maximums correspond to paths that have been reflected by obstacles.

A physical echo associated with a physical peak corresponds to all of the echoes contained in a time window [$\tau i - \delta \tau \iota$, $\tau i + \delta \tau \iota$], with $\tau i - \delta \tau \iota$ and $\tau i + \delta \tau \iota$ being the delays associated with the amplitude down by n dB, typically 3 dB, relative to the amplitude at $\tau i$. Two delays $\tau i - \delta \tau \iota$ and $\tau i + \delta \tau \iota$ are associated with two ellipses defining an elliptical ring. The physical echo corresponds to the paths reflected more particularly by an obstacle. Thus, each obstacle is situated in an elliptical ring defined by two locating ellipses.

In entirely equivalent manner, the elliptical ring may be considered as being defined by two ellipses associated with the delays $\tau i$ and $\tau i - \delta \tau \iota$, or else with the delays $\tau i$ and $\tau i + \delta \tau \iota$. Under such circumstances, $\delta \tau \iota$ corresponds to a width that is half that of the width of the physical peak defined by the delays $\tau i - \delta \tau \iota$ and $\tau i + \delta \tau \iota$.

Below in this document, the echoes taken into consideration are $\tau i$ and $\tau i + \delta \tau \iota$, and the associated width of the physical peak that is taken into consideration is $\delta \tau \iota$.

The distance between two ellipses associated with the echoes under consideration, having the same focuses, associated with the reflection of a wave on a given obstacle, determines spatial uncertainty $\Delta r$ concerning the position of the obstacle in a plane normal to the transmitter-receiver axis, which uncertainty has the particular feature of varying as a function of the distance d1 of this plane from the transmitter.

Determining the path variation $\Delta d$ corresponding to the echoes under consideration, $\tau i$ and $\tau i + \delta \tau \iota$, can make it possible to obtain an experimental value $\Delta' r$ for the spatial position uncertainty obtained by measuring the width $\delta \tau \iota$ of the physical peak multiplied by the speed c of the wave, and thus to determine the distance d1 between the transmitter and the plane normal to the transmitter-receiver axis given the above-mentioned particular feature.

The distance d1 may be determined on the spatial position uncertainty $\Delta r$ of the obstacle being expressed theoretically as two sub-expressions, the first of which is a function of the transmitter-receiver distance d and of the relative delays between the direct path $\tau 0$ and the respective reflective paths $\tau i$ and $\tau i + \delta \tau \iota$ providing the parameters of the ellipses, with the second one of them depending on the normalized variable d1/d. The second sub-expression corresponds to a so-called "normalized theoretical" function, having values taken from a chart.

Measuring the delays $\tau 0$, $\tau i$, and $\tau i + \delta \tau \iota$, which gives the time width $\delta \tau i = \Delta' r/c$ of the physical peak under consideration, then makes it possible to determine the distance d1 of the normal plane from the transmitter-receiver axis containing the obstacle by comparing the ratio of $\Delta' r$ divided by the first sub-expression with the values in the chart.

Ambiguity remains concerning the position of the obstacle, which ambiguity is associated with the symmetry of the normalized theoretical function. This ambiguity can be lifted in particular by estimating the arrival angle on reception of the wave reflected on the obstacle with the help of an estimate of the Doppler delay function associated with the physical peak. This angle is compared with the possible theoretical values deduced from the estimate of d1 and of the radius of the circle defining the ellipse associated with $\tau i$ in the plane normal to the transmitter-receiver axis containing the obstacle.

2. Example Implementation 2.1 Mathematical Aspects

In the implementation described below, a locating method of an embodiment of the invention thus consists in detecting the main peak and at least one meaningful peak, referred to as physical peaks, in the power profile of the estimated impulse response of the propagation channel, and in extracting pertinent parameters therefrom.

These pertinent parameters are the delays associated with the main and meaningful peaks under consideration and the width under consideration of the physical peak $\Delta' ri/c$. Thereafter, they make it possible to deduce a normalized function taking account of a ratio d1/d, where d is the distance between the transmitter and the receiver associated with the main peak, and d1 is the distance between the transmitter and the obstacle to be located (corresponding to the meaningful peak).

This normalized function gexp($\tau 0$, $\tau 1$, $\tau 2$) is then compared with a theoretical function g(d1/d) that is represented by a chart in order to obtain the distance d1 and thus the location of the obstacle.

An embodiment of the invention is based on the fact that the main peak on the power profile of the impulse response corresponds to the direct path between the transmitter and the receiver and that a meaningful peak represents a physical echo resulting from the presence of an obstacle on the path of the waves between the transmitter and the receiver.

Furthermore, this meaningful peak is characterized by a relative amplitude relative to the main peak, and by a time width $\delta \tau i$ at −3 dB relative to the maximum amplitude of the meaningful peak in question having a propagation delay $\tau_i$ relative to a reference instant, corresponding to the instant at which the test signal was transmitted.

A peak of the power profile is said to be meaningful secondary peak if its relative amplitude compared with the amplitude of the main peak satisfies predetermined criteria, such as thresholds that may depend for example on the environment containing the terminals (i.e. the transmitter, the receiver, and the obstacles). These predetermined thresholds lie typically at −20 dB from the amplitude of the main peak of the power profile of the propagation channel. Thus, in this numerical example, a secondary peak is taken as being a meaningful peak if its amplitude is down relative to the amplitude of the main peak by no more than −20 dB.

As mentioned above, the principle of an embodiment of the invention also relies on the fact that the transmitter and the receiver (spaced apart by a distance d) are positioned at focuses of different ellipses having parameters that depend on the physical peaks observed in the power profile of the impulse response of the propagation channel.

Thus, at each meaningful secondary peak, resulting from the effect of an obstacle on the transmitted waves, there is an associated elliptical ring defined by two locating ellipses, characterized by a corresponding propagation delay $\tau_i$ and by a corresponding time width under consideration $\delta\tau_i$ of the physical echo (i.e. two delays, e.g. $\tau_i$ and $\tau_i + \delta\tau_i$).

The delay $\tau i$ and the time width $\delta\tau i$ associated with a physical echo of amplitude Ai make it possible to obtain a first location for the obstacle, associated with position ambiguity linked to symmetry of the position of the obstacle relative to the transmitter and to receiver, and to the corresponding symmetry of the theoretical function g(d1/d).

A suitable test signal enabling the impulse response of the channel to be estimated and enabling the time-varying impulse response of the channel to be processed then enables this ambiguity to be lifted.

An extension of the practice of calculating Fresnel zones (described in greater detail in Appendix A forming an integral portion of the description and used in undulating propagation theory) and using knowledge about the multi-path propagation channel for locating obstacles in three dimensions makes it possible to demonstrate that the physical resolution of an echo of the impulse response of the propagation channel (considered as corresponding to spatial resolution) depends on:

firstly the width of the transmission band B of the system or of the analysis band B under consideration; and secondly the position of the plane normal to the transmitter-receiver axis containing the obstacle, i.e. the distance d1 between the normal plane and the transmitter (the distance between the normal plane and the receiver is written d2 (=d−d1)).

In an embodiment of the invention, individual resolutions or "margins" are defined that are associated with all of the variables used, such as the distances between the paths, the durations of the paths, or the radiuses of the ellipses. These individual resolutions make it possible to determine the threshold values of the variables leading to the distance d1 being determined for infinitesimal variations associated with the limits of the transmission system.

Consideration is given initially to an elementary path variation $\delta d$ corresponding to the smallest distance that is detectable for the system under consideration between a direct echo and a reflected echo.

This elementary path variation $\delta d$ corresponds to two paths that are separated by a duration equal to $\delta\tau$, and it is therefore equal to $c\delta\tau$, where c is the speed of light. $\delta\tau$ is defined as being the elementary mathematical resolution of the echoes of the impulse response of the channel and it is equal to 1/B.

This gives $\delta d = c/B$.

This elementary path variation $\delta d$ gives rise to an elementary radius variation $\delta r$ in the plane normal to the transmitter-receiver axis situated at a distance dl from the transmitter. $\delta r$ corresponds to an elementary spatial position resolution of the obstacle.

Thus, two echoes are considered as being indissociable if a path variation between those two echoes is less than $\delta d$ (or if a time variation between those two echoes is less than $\delta\tau$, or indeed if a variation of radius associated with those two echoes is less than $\delta r$).

Thus, by virtue of equation 2 given in Appendix A, it is possible to write the elementary spatial resolution as follows:

$$\delta r = \sqrt{2\delta d \frac{d_1 d_2}{d_1 + d_2}} = \sqrt{2\delta d} \sqrt{\frac{d_1 d_2}{d_1 + d_2}} = \sqrt{\frac{2c}{B}} \sqrt{\frac{d_1(d - d_1)}{d_1 + (d - d_1)}} = \sqrt{\frac{2cd}{B}} \sqrt{\frac{d_1}{d}\left(1 - \frac{d_1}{d}\right)} \quad (3)$$

Assuming that $\delta r \ll d1$ and $\delta r \ll (d-d1)$ (a condition specified in Appendix A), that implies that $$\frac{2c}{Bd} \ll 1$$

and therefore that $$\frac{2c\delta\tau}{d} \ll 1.$$

Figure 3:
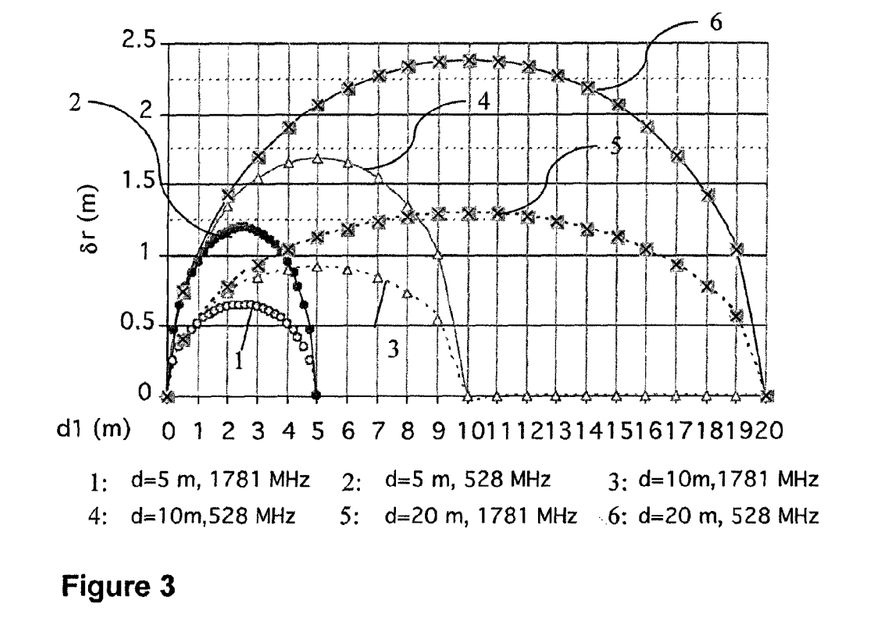
FIG. 3 shows examples of elementary spatial resolution as a function of distances d and d1, and of the transmission bandwidth B.

FIG. 3 gives examples of curves of values of the elementary spatial resolution $\delta r$ for different distances d1 and d associated with two ultra-large band (ULB) type reference systems, one corresponding to the ECMA-368 system having a bandwidth B equal to 528 megahertz (MHz), the other to the IEEE802.15.3c system, having a bandwidth B equal to 1781 MHz.

2.2 Description of an Implementation

With reference to FIGS. 4 to 9, there follows a description of an exemplary implementation of the method of the invention for locating an obstacle.

Figure 4:
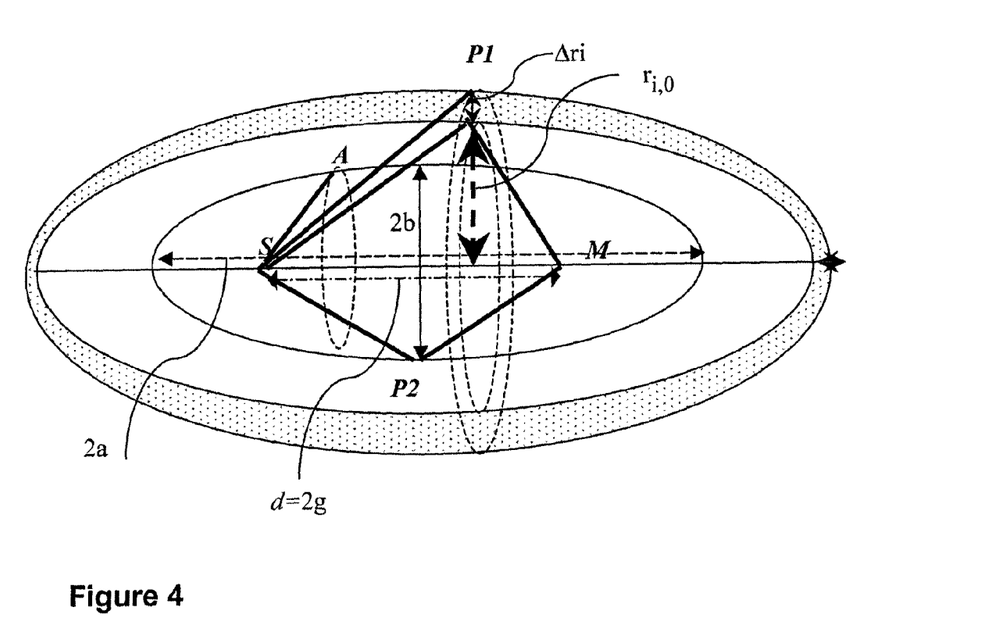
FIG. 4 shows an example of a physical representation of a propagation channel having two obstacles (A) and (P1)

As shown in FIG. 4, the transmitter S and the receiver M are situated at the focuses of an ellipse and they are spaced apart by a distance d.

An obstacle A is situated on a first ellipse having the same focuses, characterized by a distance 2a=d(S,A)+d(A,M) that is constant regardless of the position of A on the ellipse of parameters {a,b,g}, with 2g=d, a being half the major axis of the ellipse and b being half the minor axis.

It is possible to associate a plurality of obstacles located at different points of the ellipse corresponding to the same propagation delay $\tau$. Each echo $\tau$ of the impulse response of the propagation channel thus corresponds to the contribution of a plurality of waves having different directions or else situated in a solid angle $d\Omega$ corresponding to an obstacle, presenting a given delay $\tau$ and an additional distance $\Delta d$ relative to a direct path.

Figure 5:
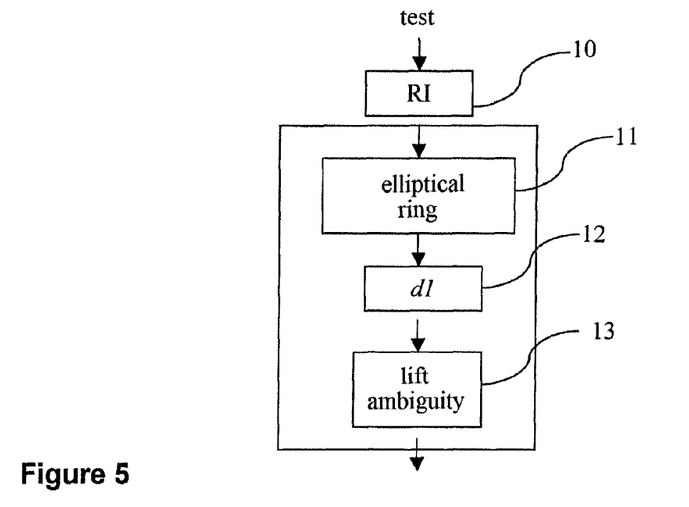
FIG. 5 describes the main steps of the locating method in an exemplary implementation of the invention, in an environment as shown in FIG. 3.

FIG. 5 shows the various steps performed in this implementation of the method of the invention.

Thus, a first step 10 of estimating the impulse response of the transmission channel between the transmitter S and the receiver M is performed by the transmitter transmitting a signal. The signal is conveyed along a direct path between the transmitter and the receiver, and along at least two paths reflected by at least one obstacle $P_i$ that it is desired to locate.

The impulse response of the channel may be estimated by various known techniques that are not described in detail herein, e.g. by inserting pilots in the signal that is transmitted or by transmitting a test signal.

Figure 6:
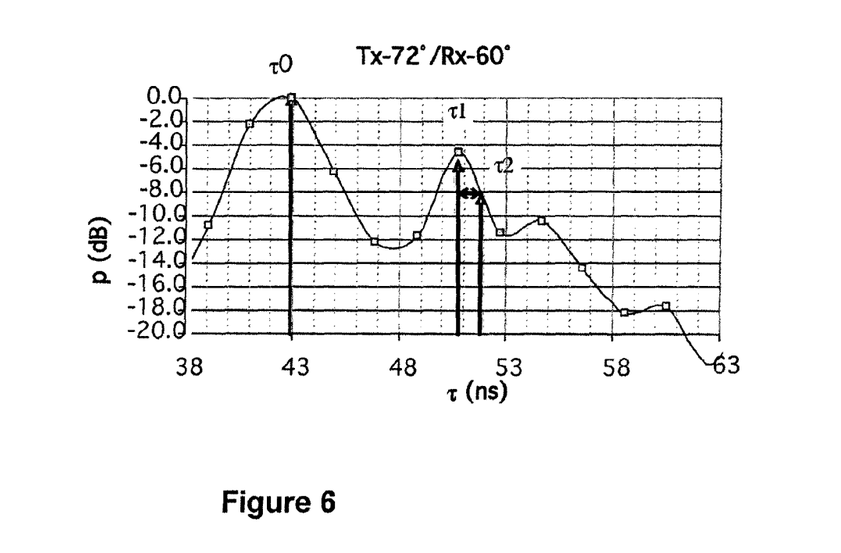
FIG. 6 shows an example of the power profile of the impulse response of a propagation channel including a main peak and a physical peak.

As shown in FIG. 6, in this implementation, the power profile of the impulse response presents at least one peak representative of a delay $\tau_0$ that is associated with the direct path, and at least one peak representative of delay $\tau_1$ and $\tau_2$ and having a width At associated with paths reflected on an obstacle $P_1$.

In FIG. 6, the propagation channel is measured at 60 gigahertz (GHz) with antennas having beamwidths in the azimuth plane of 72° and of 60° respectively on transmission and on reception. The bandwidth of the propagation channel is 512 MHz, thereby providing echoes with a mathematical resolution given by δτ=1.95 nanoseconds (ns). The transmitter-receiver distance d is 12.89 meters (m).

As mentioned above, it is possible to associate a plurality of obstacles located at different points of the ellipse corresponding to the same propagation delay τ and it is thus possible to associate each coefficient $\beta_j(t)$ of the impulse response $h(t, \tau)$ corresponding to a delay $\tau_j$ with an ellipse having a major axis of length $2a_j$, such that $2a_j = c\tau_j$.

The impulse response $h(t, \tau)$ can be written in the following form:

$$h(t, \tau) = \sum_{j=0}^{N-1} \beta_j(t) \cdot \delta(\tau - \tau_j(t))$$

The obstacles placed on a given ellipse generate an echo and provide the complex coefficient $\beta_j(t)$ of the impulse response of the channel associated with the path $\tau_j(t)$.

As shown in FIG. 4, there are as many ellipses (the figure shows two ellipses for the obstacle P1) for locating position as there are distinct echoes, if the separation Δt between two delays $\tau_i$ and $\tau_j$ is greater than the mathematical resolution δτ. Under such circumstances, the difference 2Δa between the two ellipses, as generated by the separation Δτ, is greater than cδτ.

Thus, if $\tau_i \neq \tau_j$ (if the separation Δτ between two delays $\tau_i$ and $\tau_j$ is greater than the mathematical resolution δτ), then it is considered that:

$$2\Delta a \gg c\delta\tau = \frac{c}{B}$$

Estimating the impulse response makes it possible to determine the theoretical parameters {ai,bi,gi} associated with the locating ellipses. Each reflected path is associated with an ellipse of parameters ai,bi,gi corresponding respectively to the half length of the major axis of the ellipse (ai), the half length of the minor axis (bi), and the distance between the focuses of the ellipse (2g=d) for the delay τi. These parameters can be deduced from the identification of the main path and of the reflected path i.

It is shown above that distinguishing between echoes of the impulse response of the propagation channel, as represented by the presence of two ellipses, implies a variation of the radius Δr in the normal plane. A difference 2Δa between the two ellipses thus corresponds to a radius variation Δr.

The second step 11 of identifying the elliptical ring (or the two locating ellipses that characterize it) of the obstacle $P_i$ is then performed on the basis of the impulse response estimated during step 10. As mentioned above, a plurality of ellipses may be taken into consideration, depending on which delays are taken into account.

Situation in which the delays under consideration are τi−δτι and τi+δτι

Identifying two ellipses having the same physical peak relies on estimating the relative amplitude of the echoes contained in the peak such that their respective amplitudes relative to the maximum amplitude are typically 3 dB down. A time width is defined in this example that is associated with the physical peak and that corresponds to the separation between two echoes of the same physical peak characterized by an amplitude variation that is typically 3 dB relative to the echo of maximum amplitude in the peak. Under such circumstances, a factor of two needs to be taken into account in the equations.

Situation in which the delays under consideration are τi−δτι and τi or τi+δτι and τi One of the two ellipses is determined by the delay τi that corresponds to a maximum amplitude of the physical peak under consideration. The second ellipse associated with the same physical peak is identified on the basis of an estimate of the relative amplitude of the echoes contained in the peak, such that their amplitudes relative to the maximum amplitude at τi are typically 3 dB down. A time width is defined in this example associated with this physical peak as being the separation between the two echoes of the same physical peak characterized by an amplitude variation between them that is typically 3 dB.

The identified ellipses have as their focuses the transmitter and the receiver and in the implementation described they correspond to propagation delays $\tau_i$ and $\tau_{i+1}$ of two indirect paths of the wave for a given obstacle situated in the plane normal to the transmitter-receiver axis at a distance dl from the transmitter or the receiver.

Thus, from these two locating ellipses of respective radiuses $r_{i,0}$ and $r_{i+1,0}$, a radius variation $\Delta r_i$ is determined that corresponds to a separation in a plane normal to the major axis between the radiuses $r_{i,0}$ and $r_{i+1,0}$ (such a radius not being the radius of an ellipse but the radius of the circle passing through the obstacle). The radius variation $\Delta r_i$ is thus written as follows: $\Delta r_i = r_{i+1,0} - r_{i,0}$ and is determined as follows.

If the delay associated with the direct path is written $\tau_0$ and the delay associated with a path reflected by the nearest obstacle is written $\tau_i$, it is then possible to write $\Delta \tau_i = \tau_i - \tau_0$. As a result of equation (1c) in Appendix A, the associated radius $r_{i,0}$ is given as follows:

$$r_{i,0}(=h) = \sqrt{2\Delta d \frac{d_1 d_2}{d_1 + d_2}} = \sqrt{2c(\tau_i - \tau_0)d} \sqrt{\frac{d_1}{d}\left(1 - \frac{d_1}{d}\right)} \quad (1d)$$

i.e.:

$$r_{i,0} = \sqrt{2c(\tau_i - \tau_0) \cdot d} \sqrt{\frac{d_1}{d}\left(1 - \frac{d_1}{d}\right)} \quad (4)$$

providing the condition $$\frac{2c(\tau_i - \tau_0)}{d} \ll 1$$

is true (thus if $\tau_i \neq \tau_0$).

It is thus possible to calculate the radius associated with a respective path as a function of the delay of that path relative to the direct path.

It is also possible to calculate the radius variation $\Delta r_i$, equal to $r_{i+1,0} - r_{i,0}$, between two successive radiuses $r_{i+1,0 \text{ and } ri,0}$, i.e. corresponding to two echoes belonging to the same physical significant peak on the power profile of the impulse response, and thus corresponding to the same distance dl between the transmitter and the normal plane containing the obstacle $P_i$.

Giving consideration to equation (4) above, it is possible to write:

$$\Delta r_i = r_{i+1,0} - r_{i,0} = \sqrt{2c(\tau_{i+1} - \tau_0) \cdot d} \sqrt{\frac{d_1}{d}\left(1 - \frac{d_1}{d}\right)} - \sqrt{2c(\tau_i - \tau_0) \cdot d} \sqrt{\frac{d_1}{d}\left(1 - \frac{d_1}{d}\right)} \quad (5)$$

This radius variation $\Delta r_i$ may be calculated by solving a second degree equation (6), as written below:

$$r_{i+1,0}^2 = 2c(\tau_{i+1} - \tau_0) \cdot d \frac{d_1}{d}\left(1 - \frac{d_1}{d}\right), \, r_{i,0}^2 = 2c(\tau_i - \tau_0) \cdot d \frac{d_1}{d}\left(1 - \frac{d_1}{d}\right)$$

$$r_{i+1,0}^2 - r_{i,0}^2 =$$

$$2c((\tau_{i+1} - \tau_0) - (\tau_i - \tau_0)) \cdot d \frac{d_1}{d}\left(1 - \frac{d_1}{d}\right) = 2c(\tau_{i+1} - \tau_i) \cdot d \frac{d_1}{d}\left(1 - \frac{d_1}{d}\right)$$

whence $$c(\tau_{i+1} - \tau_i) = (r_{i+1,0}^2 - r_{i,0}^2) \frac{d}{2d_1(d - d_1)} = (\Delta r_i^2 + 2r_{i,0}\Delta r_i)\left(\frac{d}{2d_1(d - d_1)}\right)$$

and $$\Delta r_i^2 + 2r_{i,0}\Delta r_i = 2cd(\tau_{i+1} - \tau_i)\frac{d_1}{d}\left(1 - \frac{d_1}{d}\right),$$

which gives $$\Delta r_i^2 + 2r_{i,0} \cdot \Delta r_i - 2cd(\tau_{i+1} - \tau_i)\frac{d_1}{d}\left(1 - \frac{d_1}{d}\right) = 0 \quad (6)$$

It is also possible to write:

$$\Delta r_i = r_{i+1,0} - r_{i,0}$$

$$= r_{i,0}\left(-1 + \frac{\sqrt{2c(\tau_{i+1} - \tau_0) \cdot d}\sqrt{\frac{d_1}{d}\left(1 - \frac{d_1}{d}\right)}}{\sqrt{2c(\tau_i - \tau_0) \cdot d}\sqrt{\frac{d_1}{d}\left(1 - \frac{d_1}{d}\right)}}\right)$$

$$= r_{i,0}\left(-1 + \frac{\sqrt{\tau_{i+1} - \tau_0}}{\sqrt{\tau_i - \tau_0}}\right)$$

and
given that from equation (4)

$$r_{i,0} = \sqrt{2c(\tau_i - \tau_0) \cdot d}\sqrt{\frac{d_1}{d}\left(1 - \frac{d_1}{d}\right)},$$

so:

$$\Delta r_i = \sqrt{2c(\tau_i - \tau_0) \cdot d}\sqrt{\frac{d_1}{d}\left(1 - \frac{d_1}{d}\right)}\left(-1 + \frac{\sqrt{\tau_{i+1} - \tau_0}}{\sqrt{\tau_i - \tau_0}}\right) \quad (7)$$

This gives a theoretical expression for the radius variation $\Delta r_i$.

The physical resolution, written $\Delta' r_i$, can be measured from the power profile of the impulse response of the channel and it corresponds to the width taken at −3 dB of the meaningful physical peak corresponding to the delay $\tau_i$ (referred to above as the time width $\delta t_i$ of the meaningful peak) for the obstacle $P_i$ multiplied by the speed of the wave:

$$(\Delta r_i' = c \cdot (\tau_{i+1} - \tau_i) = c \cdot \delta \tau_i)$$

This value $\Delta' r_i$ is the physical resolution that is taken to be the same as the spatial resolution $\Delta r_i$ and makes it possible subsequently during a determination step 12 to determine at least one distance dl between the transmitter and the plane normal to the major axis of the ellipse. This step of determining the distance dl begins by determining a ratio d1/d from a value of the function written gexp($\tau_0, \tau_i, \tau_{i+1}$):

$$g\exp(\tau_0, \tau_i, \tau_{i+1}) = \frac{\Delta' r_i}{\sqrt{2c(\tau_i - \tau_0) \cdot d}\left(-1 + \frac{\sqrt{\tau_{i+1} - \tau_0}}{\sqrt{\tau_i - \tau_0}}\right)} \quad (8)$$

that is compared with a theoretical function $$g\left(\frac{d_1}{d}\right).$$

This value of gexp is obtained by knowing $\Delta' r_i$ and the delays $\tau_0, \tau_i$ and $\tau_{i+1}$ associated with the physical main peak as determined during step 11. Thereafter, this function gexp is compared with a theoretical function deduced from the calculation of step 12 and represented by a chart.

This theoretical function is written as follows:

$$g\left(\frac{d_1}{d}\right) = \sqrt{\frac{d_1}{d}\left(1 - \frac{d_1}{d}\right)}$$

Since from equation (7), $$g\exp(\tau_0, \tau_i, \tau_{i+1}) = g\left(\frac{d_1}{d}\right),$$

it is
possible to write:

$$\sqrt{\frac{d_1}{d}\left(1 - \frac{d_1}{d}\right)} = \frac{\Delta' r_i}{\sqrt{2c(\tau_i - \tau_0) \cdot d}\left(-1 + \frac{\sqrt{\tau_{i+1} - \tau_0}}{\sqrt{\tau_i - \tau_0}}\right)}. \quad (9)$$

As mentioned above, the following are known: $\Delta' r_i$ (from measuring the power profile of the impulse response $\Delta' r_i = c \delta \tau_i$); the delays $\tau_0, \tau_i, \tau_{i+1}$ (likewise measured from the power profile of the impulse response); and also the distance value d, obtained either from the power profile of the impulse response (given $\tau_0$, then $d=c\tau_0$); or else by direct knowledge of the distance between the transmitter and the receiver.

It is thus possible to obtain a value for gexp $(\tau_0, \tau_i, \tau_{i+1})$.

Figure 7:
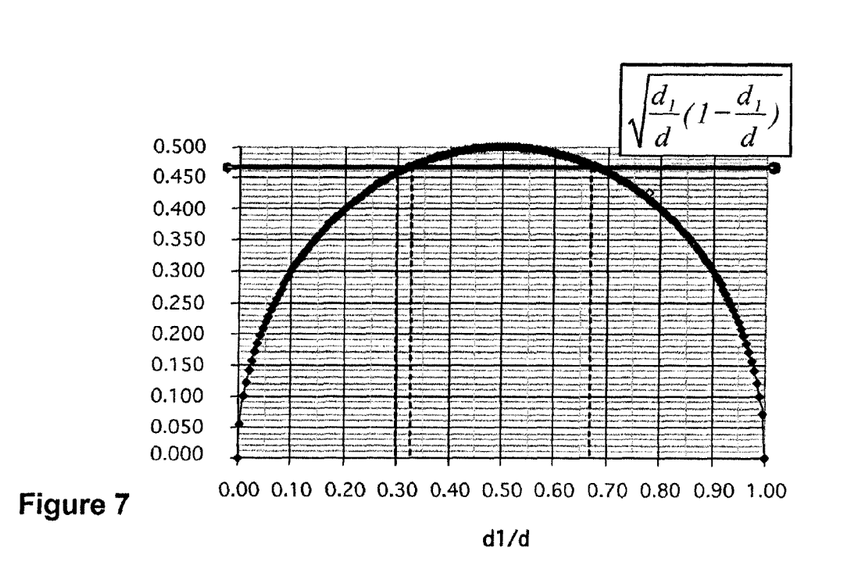
FIG. 7 is an example of a reference chart of the theoretical function used for locating an obstacle.

From this value, and using a chart, as shown in FIG. 7 representing different values of $$g\left(\frac{d_1}{d}\right),$$

it is possible to determine the value of the ratio d1/d that corresponds to the obstacle $P_i$.

This value of the ratio d1/d makes it possible to obtain at least one distance d1, but nevertheless does not make it possible to obtain the exact location of the obstacle $P_i$.

As shown in Table 1 of Appendix B, which forms an integral portion of the present description, there is position ambiguity relating to the position of the obstacle $P_i$ relative to the transmitter and to the receiver, giving a maximum of four zones in which the obstacle $P_i$ might be located.

With omnidirectional antennas and in the azimuth plane, this ambiguity leads to four positions. Given the directivity of the antennas that are usually used and the usual deployment scenarios for base stations, this configuration may be masked.

In contrast, if consideration is given only to the vertical plane or if the antennas have radiation patterns that are less than or equal to 180°, then the symmetry gives rise to ambiguity concerning two possible positions. For example, two values are determined for the variable d1/d (0.315 and 0.685), giving two values for d1 (4.06 and 8.82).

The problem under consideration at this point thus amounts to considering a situation with ambiguity covering two positions.

An embodiment of the invention proposes lifting this position ambiguity during a step 13 by considering an estimate of the Doppler delay associated with the meaningful peaks of the obstacle characterized by the delay $\tau_i$ of the secondary peak, as obtained with the help of estimates of the propagation channel for equalization or else of a test signal dedicated to estimating the impulse responses and the Doppler delay function of the propagation channel, and then by determining the arrival angle $\theta v$ at the receiver of the wave associated with the delay of the secondary peak. This angle is compared with angle values $\{\theta_{r_i}, \theta'_{r_i}\}$ deduced from knowledge of possible values for d1 and $r_{i,0}$, e.g. obtained from Table 1 in Appendix B.

The value $\{\theta_{r_i}, \theta'_{r_i}\}$ closest to $\theta v$ is the value corresponding to the arrival angle of waves of the meaningful physical peak associated with the delay $\tau_i$.

Figure 8:
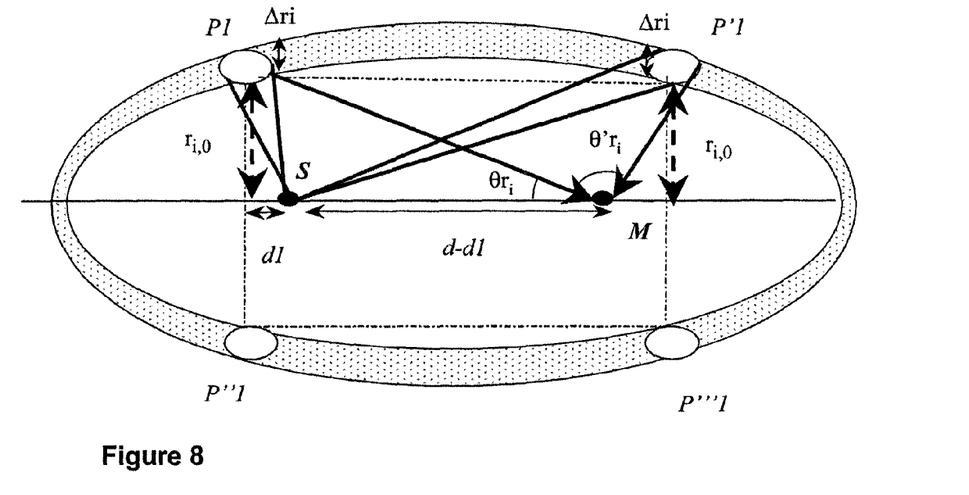
FIG. 8 shows an example of ambiguity in the locating of an obstacle.

This comparison thus makes it possible to lift the ambiguity between two possible values for d1, as shown in FIG. 8.

By way of example, consideration may be given to a system in which the rate of variation in the propagation channel is 1 meter per second (m/s). The estimate of the Doppler delay function is obtained by identifying periodization of the Doppler spectrum with a period equal to $2/\lambda$. The injection frequency of the Doppler OFDM symbol is $\lambda/4$. Furthermore, consideration is given to spatial over-sampling of the impulse response of the propagation channel along the variable t, for the purpose of improving the Doppler frequency resolution while limiting the reference symbol injection frequency.

Figure 9A:
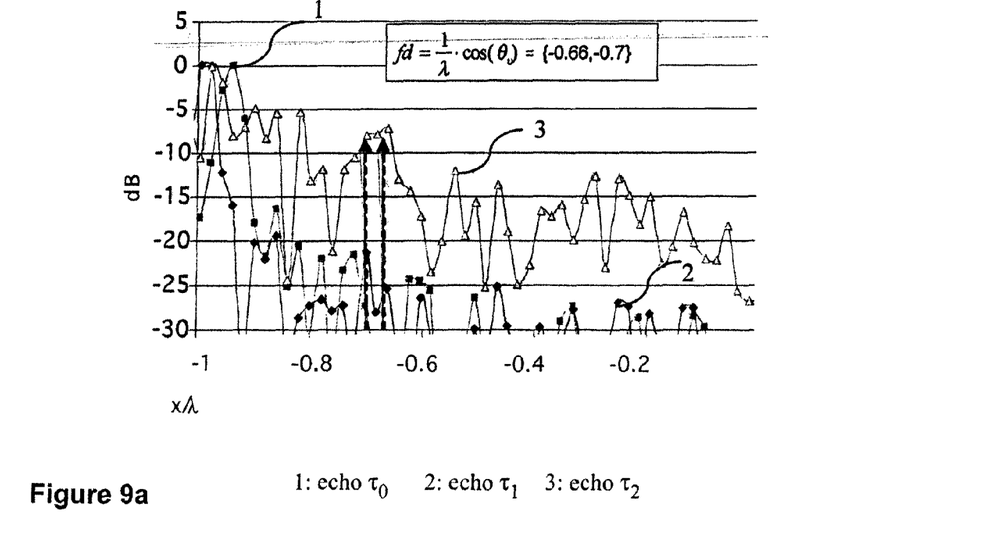
FIGS. 9a and 9b show respectively an example of a Doppler delay function and an illustration of the method of identifying the Doppler angle of meaningful peaks associated with the obstacle P1.

The Doppler spectrum under consideration is shown in FIG. 9a for the three echoes under consideration in the present implementation of the invention, namely $\tau_0$, $\tau_i(=\tau_1)$, and $\tau_{i+1}(=\tau_2)$. The Doppler components associated with the echoes $\tau_1$ and $\tau_2$ are identified in the graph of FIG. 9a for determining the Doppler angle $\theta v$.

Figure 9B:
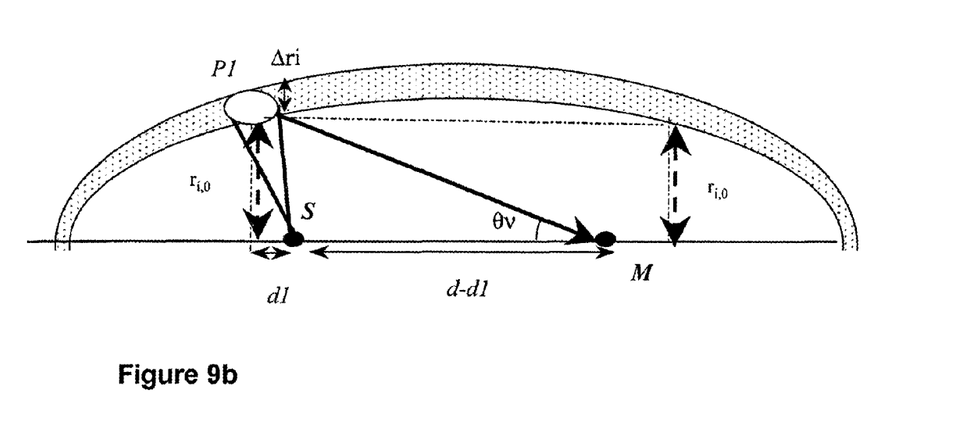

FIG. 9b is a representation of the Doppler angle for the obstacle $P_1$.

Table 2 in Appendix B gives the various angle values together with the value of dl that can be deduced therefrom.

The test signal preferably relies on injecting a reference signal into the frame for transmission at an appropriate frequency Fs, which reference signal serves to probe the impulse response of the propagation channel once every Ts and to extract the Doppler spectrum therefrom. In other circumstances, it may rely on making appropriate use of the coefficients of the propagation channel as estimated during processing dedicated to equalizing the communications signal on reception.

An embodiment of the invention thus makes it possible to obtain the exact location of the obstacle Pi, as described above.

3. Example Applications of an Embodiment of the Invention

By locating terminals in a communications network, an embodiment of the invention makes it possible to adjust radiated power levels, i.e. to form beams that are adapted to the links between the terminals, thereby limiting the probability of interference with other terminals in the vicinity of the links.

An embodiment of the invention also makes it possible to optimize management of the frequency resource dedicated to a data transmission technique.

Any communications device makes use of a dedicated frequency spectrum that is subdivided into frequency subchannels for transmitting data using a given coding scheme and given modulation, in a transmission band of width that corresponds to the size of a frequency subchannel. Additional information about the positions of terminals seeking to communicate with one another thus makes it possible to use the same radio channel if the terminals make use of communication beams that are separated in space.

An embodiment of the invention thus enables cognitive radio techniques to be improved that rely on spectrum management and on selecting frequency subchannels for use in communication.

The usual techniques for managing spectrum are known as detect and avoid (DAA) or dynamic frequency selection (DFS) in which the spectrum is probed in order to select a frequency channel for transmission purposes that is free from interfering frequencies. An embodiment of the invention enables those various techniques to be improved.

Similarly, in the field of so-called "green radio" techniques, once two terminals have been located, an embodiment of the invention serves to confine the amount of power that is radiated between the two terminals to a solid angle between the transmitter and the receiver, given knowledge of their relative positions, which solid angle combines wave dispersion with an appropriate level of power for ensuring the quality of service that is required for the link.

In an exemplary implementation, the invention thus makes it possible to detect the positions of terminals with which it is desired to communicate and to manage how the radio resource is allocated between the terminals by taking account of their relative positions.

In this way, the same radio resource can be used twice over if the coverages of the links are separate. One of the major advantages of radio links at 60 GHz is the potential for reusing the radio resource, given the short wavelength and the use of antennas that are not omnidirectional.

For example, in WPAN systems at 60 GHz, the IEE802.15.3c standard supports three modes of transmission:

an orthogonal frequency division multiplex (OFDM) transmission technique known as OFDM-AV (for audio-video), comprising a plurality of modulation and coding schemes (MCSs) in which links are point-to-point links and make use of a beam-forming type multiple-input multiple-output (MIMO) technique;

an MCS high-speed interface (HSI) OFDM transmission technique for which the links between the terminals pass via sector antennas; and a single-carrier (SC) mode associated with point-to-point links at rates that do not exceed 1.5 gigabits per second (Gbit/s).

With HSI modes, in order to facilitate communication between a plurality of terminals, the locating performed in accordance with an embodiment of the invention serves to improve the management of the channels allocated to communication by allocating the same radio frequency (RF) channel when the links occupy different zones in three-dimensional space.

This is most advantageous given that it is known there are only four RF channels defined for 60 GHz transmission in the standard, and that in Europe the first channel is not available. There therefore remain only three channels capable of using the three different transmission techniques (OFDM-AV, OFDM-HSI, and SC) associated with the standard and listed above. This leads to high probability of problems associated with multiuser interference as soon as there are more than four terminals seeking to communicate.

An embodiment of the invention thus makes it possible to locate terminals and to allocate the same RF channel to two terminals when they are in different positions in three-dimensional space and have coverage zones that are separate. Separate coverage zones for a given distance d result from using sector antennas in order to establish the links. Depending on the usage models, a certain range of antenna directivities is recommended.

For this purpose, and as described above with reference to an exemplary implementation of the invention, the following steps are performed in a particular implementation:

the receiver M estimating the impulse response of the channel with the help of the test signal transmitted by the transmitter S (reference symbol or pilot(s) injected at a frequency Fs);

determining meaningful peaks in the impulse response of the channel and determining their relative distance separations relative to the direct link between the transmitter and the receiver;

evaluating the widths of the various physical echoes in the impulse response, in order to determine the relative positions of each of the terminals generating a meaningful secondary peak in the impulse response of the propagation channel;

allocating each physical peak to the surrounding terminals close to the transmitter-receiver link;

determining the positions of the terminals among the surrounding terminals with which the transmitter seeks to establish communication; and determining the respective RF channels for the located terminals.

4. Structure of the Locating Device

Figure 10:
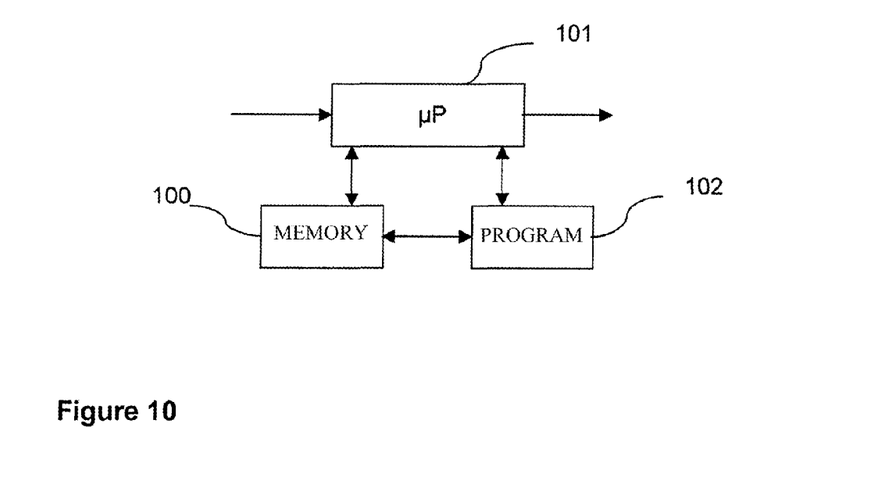
FIG. 10 shows the structure of a position-locating device performing a locating technique in a particular implementation of the invention.

Finally, with reference to FIG. 10, there follows a simplified description of the structure of a locating device for performing a technique of locating at least one obstacle in accordance with the particular implementation described above.

For example, the locating device comprises a memory 100 including a buffer memory M, a processor unit 101 having a microprocessor μP, for example, and controlled by a computer program Pg 102 that performs the locating method of an embodiment of the invention.

On initialization, the code instructions of the computer program 102 are loaded for example into a random access memory (RAM) prior to being executed by the processor of the processor unit 101. The processor unit 101 receives as input at least one test signal. The processor of the processor unit 101 performs the steps of the above-described locating method in application of the instructions of the computer program 102 in order to locate at least one obstacle. For that purpose, the locating device comprises, in addition to the memory 100, means for determining at least one elliptical ring in which the obstacle is situated, the elliptical ring being defined by two confocal ellipses having focuses that correspond to the transmitter and to the receiver, each elliptical ring being associated with echoes generated by an obstacle, means for estimating a distance between the obstacle and one of the focuses as a function of determining the separation between the confocal ellipses, in the vicinity of the obstacle, in a plane normal to the axis defined by the focuses, so as to obtain a set of potential zones in which the obstacle might be located in said ring, and means for lifting the ambiguity between the different potential location zones for the obstacle as a function of distance, thereby obtaining a location zone for the obstacle. These means are controlled by the processor of the processor unit 101.

5. Appendix A

Determining Fresnel Zones

Fresnel zones make it possible to identify the physical phenomena involved relative to wavelength during radio transmission between a transmitter S and a receiver M situated at the focuses of an ellipse, as shown in FIG. 2, in which Fresnel zones are marked. Consideration is also given to an obstacle A situated on the ellipse.

When considering a plane normal to the axis between the transmitter S and the receiver M, as situated at a distance d1 from the transmitter, it is possible to trace concentric circles of radius $r_n$ corresponding to the different Fresnel zones.

The Fresnel zones are the radiuses in the normal plane corresponding to a multiple-path separation of $\lambda/2$ between the direct wave and the wave passing via the circle when the transmitter and the receiver are spaced apart by a distance d. These waves are thus antiphase or they are in-phase, and on reception they generate different radio fields.

Each of these radiuses $r_n$ is associated with a variation $\Delta d_n$ of the path relative to the direct path that gives rise to a phase variation $\Delta \phi_n$ between the two waves. It is assumed that this phase variation is equal to $n\pi$ and generates successive destructive and constructive standing waves.

When the distance d1 varies, the locus of the points on the circle C of radius $r_n$ describes an ellipse for a given distance d=d1+d2 corresponding to the transmitter-to-receiver distance.

A plurality of obstacles may be located on this ellipse. These obstacles generate the same radio field associated with the relative distance $\Delta d$ between the direct and reflected waves.

Consideration is given below to the path difference $\Delta d$ between the direct wave and the wave reflected at the point A on a circle C of radius h situated at a distance d1 from the transmitter. This path difference $\Delta d$ is given by the following equation:

$$\Delta d \approx \frac{h^2}{2} \frac{d_1 + d_2}{d_1 \cdot d_2} \quad (1a)$$

The radius h of the circle may thus be written:

$$h = \sqrt{2\Delta d \frac{d_1 d_2}{d_1 + d_2}} \quad (1c)$$

It should also be observed that:

$$\Delta \varphi = \frac{2\pi}{\lambda} \Delta d \quad (1b)$$

It is also assumed that h<<d1 and h<<d2, with d2=d−d1.

This condition for h simplifies the expression for h, in consideration of the two right-angle triangles having a common height as shown in FIG. 2. The height h is deduced by the method that enables the hypotenuse of a right-angle triangle to be calculated. If it is assumed h<<d1 and h<<d2, it is then possible to use the limited development:

$$\sqrt{1+x} = 1 + \frac{1}{2}x$$

in order to simplify equation (1c).

Consideration is now given to a radius $r_n$ corresponding to the Fresnel radius for the $n^{th}$ Fresnel zone and associated with a path variation $\Delta d_n$ and a phase variation $\Delta \varphi_n$ equal to $n\pi$, thus making it possible to write, using equations (1a) and (1b):

$$\Delta \varphi_n = \frac{2\pi}{\lambda} \Delta d_n = n\pi \text{ and } \Delta d_n = \frac{n\lambda}{2} = \frac{r_n^2 d}{2(d-d_1)d_1}$$

Considering equation (1c), it is possible to write:

$$r_n = \sqrt{2 \Delta d_n \frac{d_1 d_2}{d_1 + d_2}} = \sqrt{n \lambda \frac{d_1 d_2}{d_1 + d_2}} \quad (2)$$

6. Appendix B

TABLE 1

| Measured parameters | | Calculated parameters | |
|---|---|---|---|
| | | d0 | 12.89 m |
| Delay τ0 | 42.968 ns | gexp | 0.464 |
| Delay τ1 | 50.78 ns | d1/d | {0.315, 0.685} |
| Delay τ2 | 52.1 ns | d1 | {4.06, 8.82} m |
| Δ'rj = c δτj | 0.293 m | r1 | 3.6 m |

TABLE 2

| | | |
|---|---|---|
| Cos (θv) | −0.66, −0.70 | 0.85 π |
| Tan(θ$_{rj}$) ≈ θ$_{rj}$ | 0.88 | |
| Tan(θ'$_{rj}$) ≈ θ'$_{rj}$ | 0.408 | → d1 = 4.06 m |

Although the present disclosure has been described with reference to one or more examples, workers skilled in the art will recognize that changes may be made in form and detail without departing from the scope of the disclosure and/or the appended claims.

The invention claimed is:

1. A method of locating at least one obstacle between a transmitter and a receiver, the method comprising the following steps:
   transmitting a signal from the transmitter to the receiver;
   determining, by the transmitter or the receiver, —at least one elliptical ring in which said obstacle is situated, said elliptical ring being defined by two confocal ellipses, having their focuses corresponding to said transmitter and to said receiver, each elliptical ring being associated with a physical echo of the signal generated by an obstacle on the basis of three propagation delays corresponding respectively to at least two meaningful peaks of the impulse response of the transmission channel between said transmitter and said receiver:
      a delay τ0 corresponding to a main meaningful peak of said impulse response, representing the direct path between said transmitter and said receiver, making it possible to determine the distance between the two focuses; and
      two delays (τ1, τ2) corresponding to a given relative amplitude of a secondary meaningful peak resulting from at least two paths reflected by said obstacle, making it possible to determine a thickness for the elliptical ring;
   estimating a distance between said obstacle and said focuses as a function of determining a separation between said confocal ellipses at said obstacle in a plane normal to the axis defined by said focuses so as to obtain a set of potential location zones for said obstacle in said elliptical ring; and
   lifting ambiguity between the potential location zones of said obstacle as a function of said distance so as to deliver a location zone of said obstacle.

2. The method of locating according to claim 1, further including a prior step of estimating the impulse response of the transmission channel between said transmitter and said receiver.

3. The method of locating according to claim 1, wherein the impulse response is estimated from the signal, which is received by said receiver and corresponds to a test signal transmitted by said transmitter and known to the receiver.

4. The method of locating according to claim 1, wherein said step of determining an elliptical ring comprises the substeps of:
   obtaining a distance d between said transmitter and said receiver such that d=cτ$_0$, where c is the speed of light; and
   estimating a distance d$_1$ between said obstacle and one of said focuses as projected onto the major axis of said ellipses defined by said focuses, as a function of a reference chart and of said separation.

5. The method of locating according to claim 1, wherein said step of estimating a distance between said obstacle and one of said focuses comprises a substep of measuring the width of at least one meaningful peak associated with said obstacle.

6. The method of locating according to claim 5, wherein said width is measured at −3 dB of said meaningful peak.

7. The method of locating according to claim 1, wherein said step of lifting ambiguity comprises a substep of estimating a Doppler delay function for at least one delay associated with a meaningful peak associated with said obstacle.

8. The method of locating according to claim 7, wherein said estimation of a Doppler delay delivers an estimate of the arrival angle θv of a test signal at said receiver, for said delay; and said step of lifting the ambiguity comprises a step of comparing the value of said arrival angle θv with at least one predetermined angle value for said potential location zones.

9. The method of locating according to claim 1, wherein the method further comprises a step of managing resource allocation in a communications network to which said transmitter and said receiver belong, as a function of said location zone.

10. The method of locating according to claim 1, wherein said at least one obstacle corresponds to at least one interfering element; and said method also comprises a step of adjusting radiation patterns of antennas of said communications network to obtain radiation patterns that are adjusted so that said at least one interfering element does not lie in a direction of transmission from said antennas.

11. A device for locating at least one obstacle between a transmitter and a receiver, the device comprising:
means for determining at least one elliptical ring in which said obstacle is situated, said elliptical ring being defined by two confocal ellipses having focuses that correspond to said transmitter and to said receiver, each elliptical ring being associated with a physical echo generated by an obstacle;
means for estimating a distance between said obstacle and one of said focuses as a function of determining the separation between said confocal ellipses at said obstacle in a plane normal to the axis defined by said focuses, so as to obtain a set of potential location zones for said obstacle in said ring; and
means for lifting the ambiguity between the various potential location zones for said obstacle as a function of said distance so as to deliver a location zone for said obstacle.

12. A non-transitory computer-readable medium comprising a computer program product recorded thereon and executable by a processor, the product comprising program code instructions for executing steps of a method of locating at least one obstacle between a transmitter and a receiver when said program is executed by the processor, wherein the instructions comprise:
instructions that configure the processor to determine at least one elliptical ring in which said obstacle is situated, said elliptical ring being defined by two confocal ellipses, having their focuses corresponding to said transmitter and to said receiver, each elliptical ring being associated with a physical echo generated by an obstacle on the basis of three propagation delays corresponding respectively to at least two meaningful peaks of the impulse response of the transmission channel between said transmitter and said receiver:
a delay $\tau 0$ corresponding to a main meaningful peak of said impulse response, representing the direct path between said transmitter and said receiver, making it possible to determine the distance between the two focuses; and
two delays ($\tau 1$, $\tau 2$) corresponding to a given relative amplitude of a secondary meaningful peak resulting from at least two paths reflected by said obstacle, making it possible to determine a thickness for the elliptical ring;
instructions that configure the processor to estimate a distance between said obstacle and said focuses as a function of determining a separation between said confocal ellipses at said obstacle in a plane normal to the axis defined by said focuses so as to obtain a set of potential location zones for said obstacle in said elliptical ring; and
instructions that configure the processor to lift ambiguity between the potential location zones of said obstacle as a function of said distance so as to deliver a location zone of said obstacle.

* * * * *